(12) United States Patent
Gardner

(10) Patent No.: US 11,615,948 B1
(45) Date of Patent: Mar. 28, 2023

(54) ION PUMP FOR USE IN LOW GRAVITY ENVIRONMENTS

(71) Applicant: Hamilton Sundstrand Corporation, Charlotte, NC (US)

(72) Inventor: Benjamin D. Gardner, Colton, CA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/521,706

(22) Filed: Nov. 8, 2021

(51) Int. Cl.
*H01J 41/12* (2006.01)
*B64G 1/40* (2006.01)

(52) U.S. Cl.
CPC .............. *H01J 41/12* (2013.01); *B64G 1/405* (2013.01)

(58) Field of Classification Search
CPC ...................................................... H01J 41/12
See application file for complete search history.

(56) References Cited

U.S. PATENT DOCUMENTS

| 3,343,781 A | 9/1967 | Phillips et al. |
| 4,687,417 A | 8/1987 | Amboss |
| 8,439,649 B2 | 5/2013 | Rutherford et al. |
| 9,837,243 B2 | 12/2017 | Kasuya et al. |

*Primary Examiner* — Joseph L Williams
(74) *Attorney, Agent, or Firm* — Cantor Colburn LLP

(57) ABSTRACT

According to an embodiment, an ion pump for use in a low gravity environment includes a housing at least partially defining a pumping chamber, the pumping chamber enclosing a first cathode plate and a second cathode plate, and a plurality of cylindrical anodes disposed between the first cathode plate and the second cathode plate. The ion pump also includes a feedthrough extending external to the pumping chamber from a wall of the housing, and a baffle including a body disposed in a space between the plurality of anodes and an inner surface of the wall. The body has dimensions selected to prevent particles having a size greater than a selected particle size from migrating from the pumping chamber to the feedthrough when in the low gravity environment.

20 Claims, 3 Drawing Sheets

ION PUMP FOR USE IN LOW GRAVITY ENVIRONMENTS

BACKGROUND

Exemplary embodiments pertain to the art of ion pumps and, in particular, to ion pumps configured for use in low gravity environments.

An ion pump is a type of vacuum pump that is able to produce high quality vacuums. Ion pumps are used in various applications that require high vacuums, such as mass spectrometry. An ion pump achieves a vacuum by ionizing molecules that drift into a cylindrical anode from a vacuum space, then driving them to a cathode surface using an electric field. The ions sequestered in the cathode material are thus removed from the vacuum space. Over time, material is ejected (sputtered) from the cathode and can deposit on surfaces of the vacuum space. The deposited material can break off or otherwise separate from the surfaces, which in low or zero gravity environments can affect ion pump operation.

BRIEF DESCRIPTION

According to an embodiment, an ion pump for use in a low gravity environment includes a housing at least partially defining a pumping chamber, the pumping chamber enclosing a first cathode plate and a second cathode plate, and a plurality of cylindrical anodes disposed between the first cathode plate and the second cathode plate. The ion pump also includes a feedthrough extending external to the pumping chamber from a wall of the housing, and a baffle including a body disposed in a space between the plurality of anodes and an inner surface of the wall. The body has dimensions selected to prevent particles having a size greater than a selected particle size from migrating from the pumping chamber to the feedthrough when in the low gravity environment.

In addition to one or more of the features described herein, or as an alternative, the selected particle size is in a range of about 0.01 inches to about 0.02 inches.

In addition to one or more of the features described herein, or as an alternative, the selected particle size is less than or equal to a size of particles of material that have separated from surfaces of the pumping chamber.

In addition to one or more of the features described herein, or as an alternative, the dimensions include a thickness of the body, the thickness selected so that the body and the inner surface define a gap between the baffle and the inner surface, the gap having a width that is less than or equal to the selected particle size.

In addition to one or more of the features described herein, or as an alternative, the body includes one or more passageways configured to permit passage of gas molecules and other particles that are smaller than the selected particle size into the feedthrough.

In addition to one or more of the features described herein, or as an alternative, the one or more passageways includes one or more slots.

In addition to one or more of the features described herein, or as an alternative, the one or more passageways extend through a body of the baffle.

In addition to one or more of the features described herein, or as an alternative, the ion pump further includes a terminal having a base portion and a post, the base portion in electrical contact with the anodes, the body disposed between the base portion and the inner surface of the wall.

In addition to one or more of the features described herein, or as an alternative, the body includes an opening configured to permit the body to be inserted in the space and at least partially surround the post.

In addition to one or more of the features described herein, or as an alternative, the low gravity environment is a zero gravity environment.

According to an embodiment, a method of assembling an ion pump for use in a low gravity environment includes inserting a baffle including a body into a housing that at least partially defines a pumping chamber. The housing supports a first cathode plate and a second cathode plate, and a plurality of cylindrical anodes disposed between the first cathode plate and the second cathode plate, and the housing is connected to a feedthrough extending externally from a wall of the housing. Inserting the baffle includes disposing the body into a space between the plurality of anodes and an inner surface of the wall, and the body has dimensions selected to prevent particles having a size greater than a selected particle size from migrating from the pumping chamber to the feedthrough when in the low gravity environment. The method also includes forming the pumping chamber by enclosing the first cathode plate, the second cathode plate, the plurality of anodes and the baffle.

In addition to one or more of the features described herein, or as an alternative, the selected particle size is in a range of about 0.01 inches to about 0.02 inches.

In addition to one or more of the features described herein, or as an alternative, the selected particle size is less than or equal to a size of particles of material that have separated from surfaces of the pumping chamber.

In addition to one or more of the features described herein, or as an alternative, the dimensions include a thickness of the body, the thickness selected so that the body and the inner surface define a gap between the baffle and the inner surface, the gap having a width that is less than or equal to the selected particle size.

In addition to one or more of the features described herein, or as an alternative, the body includes one or more passageways configured to permit passage of gas molecules and other particles that are smaller than the selected particle size into the feedthrough.

In addition to one or more of the features described herein, or as an alternative, the one or more passageways includes one or more slots.

In addition to one or more of the features described herein, or as an alternative, the one or more passageways extend through a body of the baffle.

In addition to one or more of the features described herein, or as an alternative, a terminal having a base portion and a post is in electrical contact with the anodes, and inserting the baffle includes disposing the baffle between the base portion and the inner surface of the wall.

In addition to one or more of the features described herein, or as an alternative, the body includes an opening configured to permit the body to be inserted in the space and at least partially surround the post.

In addition to one or more of the features described herein, or as an alternative, the low gravity environment is a zero gravity environment.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
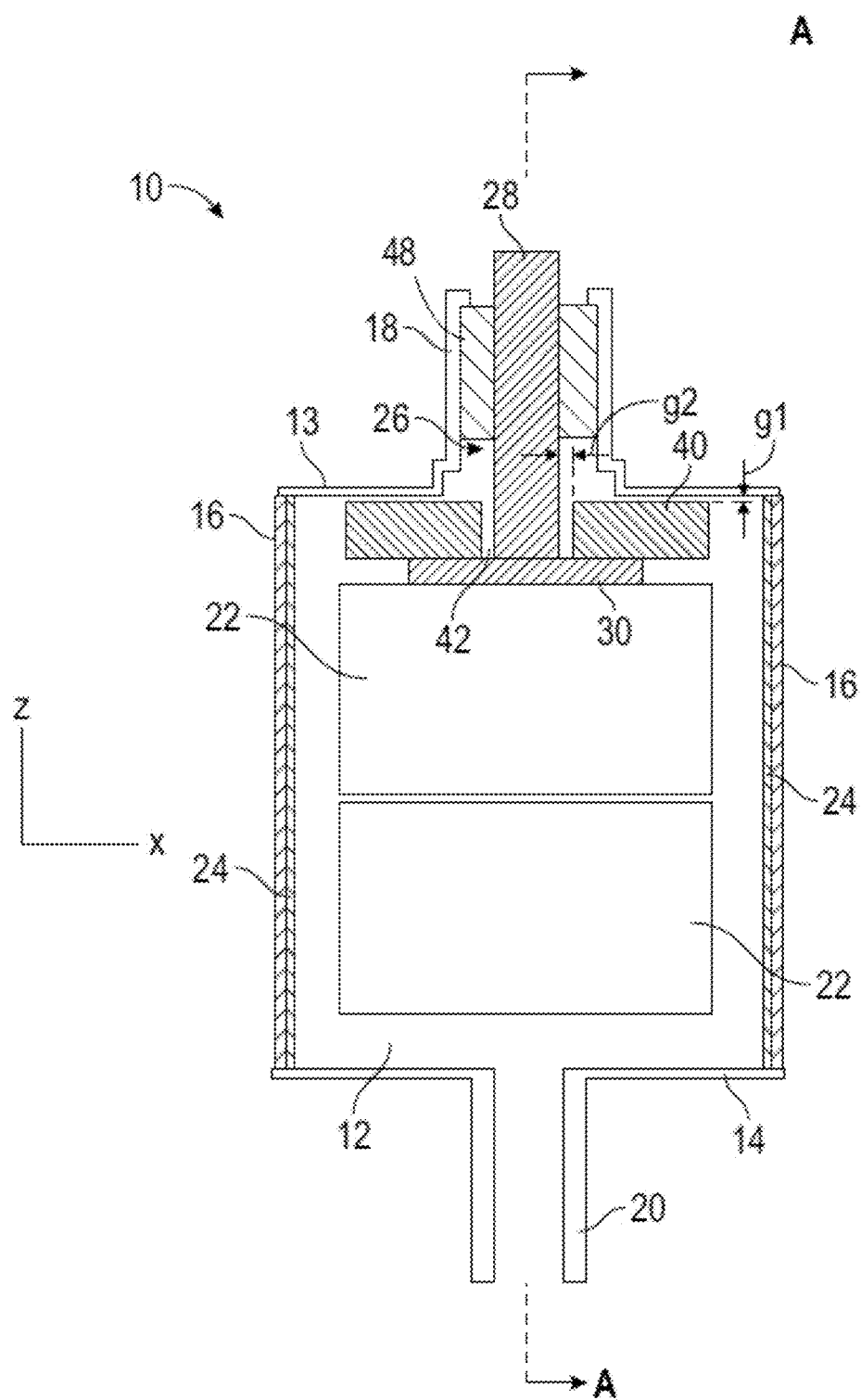
FIG. 1 is a side cross-sectional view of an embodiment of an ion pump including a baffle for controlling migration of particles.

A detailed description of one or more embodiments of the disclosed apparatus and method are presented herein by way of exemplification and not limitation with reference to the Figures.

Devices and methods are provided for pumping using an ion pump (also referred to as a sputter ion pump). An embodiment of an ion pump for use in low gravity environments includes a body that at least partially defines a pumping chamber. The body includes or is connected to a vacuum flange and a feedthrough for connecting the ion pump anodes to an electrical power source. A plurality of cylindrical anodes are disposed in the pumping chamber, and flat cathodes are disposed at opposing sides of the pumping chamber and spaced from the ends of the anodes.

The ion pump includes or may be fitted with a baffle configured to prevent sputtered material (and/or other material forming the pumping chamber) that separates from surfaces of the pumping chamber from reaching the feedthrough and potentially causing a short circuit. In an embodiment, the baffle is a body configured to be inserted in a space between the anodes and an inner surface of a wall of the housing from which the feedthrough extends. The body may be inserted prior to or during assembly of the feedthrough, or inserted into the body after the feedthrough is assembled and attached to the housing. The baffle has a size and shape configured to control the migration of particles larger than a selected size (e.g., the selected particle size is larger than the size of sputtered particles or pieces of cathode material that do not deposit on surfaces in the pumping chamber), and prevent such larger particles from drifting near the feedthrough when the ion pump is in a low gravity environment (e.g., a zero gravity environment). For example, the baffle is a rectangular or disc-shaped body having a thickness that spans a distance between the anodes and the wall of the housing. The baffle acts to block particles of at least the selected size while allowing gases (and particles smaller than the selected size) to pass through.

At least some embodiments described herein present a number of advantages and technical effects. For example, an ion pump including a baffle described herein is capable of being used effectively in low gravity environments, such as zero gravity environments. Over time, as cathodes are bombarded with ions, particles of cathode material are ejected or sputtered from the cathodes and can deposit on surfaces of the pumping chamber. Particles or pieces of material can separate (e.g., flake or break off) from the surfaces. In normal gravity, particles of the separated material tends to settle on the bottom of the pumping chamber. In zero gravity, the particles of the separated material can drift into the feedthrough and cause electrical shorting. At least some embodiments address this problem by providing a baffle that blocks such particles while allowing gas molecules to retain freedom of movement within the pumping chamber. In addition, as the baffle can be easily inserted into the pump's sputtering chamber, ion pumps can be easily adapted from terrestrial use to use in low gravity environments.

Figure 2:
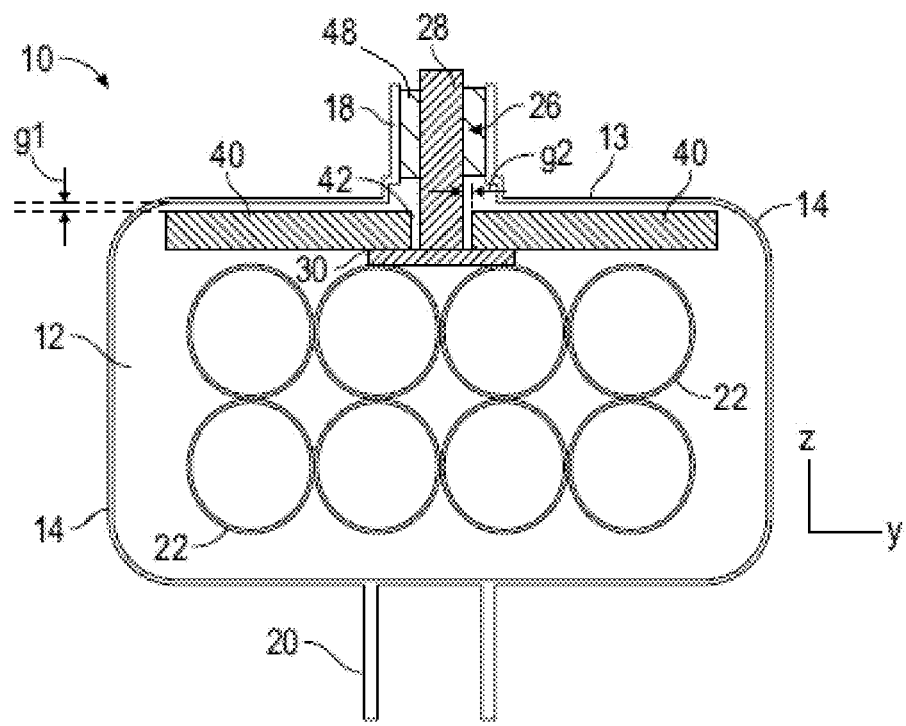
FIG. 2 is a front cross-sectional view of the ion pump and the baffle of FIG. 1.

FIGS. 1 and 2 depict an embodiment of an ion pump 10. FIG. 1 shows a side cross-section of the ion pump 10 (in an x, z plane of a three-dimensional x, y, z coordinate system). FIG. 2 shows a front cross-section (in a y, z plane) along A-A, indicated in FIG. 1.

The ion pump 10, in an embodiment, is designed for use in a low gravity environment. A low gravity environment is an environment in which gravity is less than that experienced on earth. Examples of low gravity environments include zero gravity environments and environments at or near a celestial body (e.g., the moon or a planet).

The ion pump 10 includes a pumping chamber 12 defined by a housing 14 and end caps 16. A feedthrough 18 is disposed at one end of the housing 14, and a vacuum flange 20 is disposed at an opposing end of the housing 14. The vacuum flange 20 can be connected to a volume from which the ion pump is to pump gases. An example of such a volume is a vacuum chamber of a mass spectrometer. The feedthrough 18 includes a tubular member that extends from a wall 13 of the housing 14 and the pumping chamber 12 and is configured to secure a cable from a voltage source. The feedthrough may be electrically isolated, e.g., by a ceramic separator or other insulator 48. The feedthrough 18 and/or the vacuum flange 20 may be integral with the housing 14 or may be a separate component attached to the housing 14.

The pumping chamber 12 includes an array of conductive cylindrical anodes 22 that extend horizontally along the x-axis. Each anode 22 is a hollow cylindrical member with a longitudinal axis in the direction of the x-axis. The pumping chamber 12 also includes a set of cathode plates 24 (e.g., titanium plates or discs) disposed at opposing sides of the pumping chamber 12 and spaced from each end of the anodes 22.

The ion pump 10 further includes a metallic terminal 26, which includes a post 28 that extends vertically (along the z-axis) into the feedthrough 18, and a base plate 30, such as a metallic disc. The base plate 30 is disposed on one or more of the anodes 22 such that all of the anodes 22 are electrically connected to the terminal. The ion pump 10 includes additional components, such as a U-shaped permanent magnet having poles positioned outside of the caps 16 in order to provide a magnetic field in the pumping chamber 12.

An embodiment of the ion pump 10 includes a baffle 40 that is configured to block particles above a selected particle size from entering the feedthrough. The selected particle size, in an embodiment, corresponds to the sizes of relatively large particles, i.e., particles that are larger than gas molecules and cathode sputter material that deposits on pumping chamber surfaces when the ion pump 10 is in operation. The selected particle size may be greater than or equal to the size of flakes, pieces or other particles that separate from surfaces of the pumping chamber 12. These particles are larger than the size of sputtered particles that are typically on the molecular scale. In an embodiment, the selected particle size is at least about 0.01 inches, such as 0.02 inches. Other particle sizes may be selected, such as 0.10-0.20 inches.

During operation of the ion pump 10, incoming gas molecules are ionized and then bound to surfaces in the pumping chamber 12. Atoms of cathode material and/or chemical species resulting from interaction between ions and the cathode material (e.g., titanium atoms, tantalum oxides, etc.) are sputtered during this process and deposit on the surfaces. Over time, the sputtering process leads to a build-up of sputtered material on the surfaces. Particles of deposited material (e.g., flecks, fragments, etc.) can break off or otherwise separate from the anodes 22 and/or other surfaces. In a low gravity environment, these particles can drift into an area near the feedthrough 18 where the distance between high voltage and ground is most narrow, potentially causing a short circuit. The selected particle size thus may be greater than or equal to the size of these particles.

The baffle 40 is a body made from an insulating material, such as ceramic or plastic, and is configured to be inserted into a space between the anodes 22 and an inner surface of the wall 13. The baffle 40 has dimensions selected so that flow paths are defined that permit gas molecules (and particles smaller than the selected size) to escape the area near the feedthrough 18.

In an embodiment, the baffle 40 has a thickness (in the z-axis direction) that is selected so that a gap or tolerance g1 is defined between an upper surface of the baffle 40 and an inner surface of the wall 13. The gap g1 has a width that is less than or equal to the selected particle size. For example, the distance of the space in the z-axis direction (between the base portion 30 and the inner surface of the wall 13) can be about 0.09 inches, and the thickness of the baffle 40 can be about 0.07 inches, thereby defining a gap width of about 0.02 inches.

In an embodiment, the baffle 40 includes an opening 42 that allows the baffle to be inserted into the space and partially surround the post 28. The opening 42 may be a semicircular opening that has a width in the x-axis direction. The width may be selected so that a gap g2 between the opening 42 and the post 28 is less than or equal to the selected particle size.

In another embodiment, the baffle 40 may include a central opening (e.g., a fully circular opening) that surrounds the post 28 when the baffle 40 is inserted. In this embodiment, the baffle 40 may be positioned or inserted in place during manufacture or assembly of the feedthrough 18.

In an embodiment, the baffle 40 body includes one or more passageways that provide a path for gas molecules and smaller particles to pass from the pumping chamber 12 into the feedthrough 18.

Figure 3:
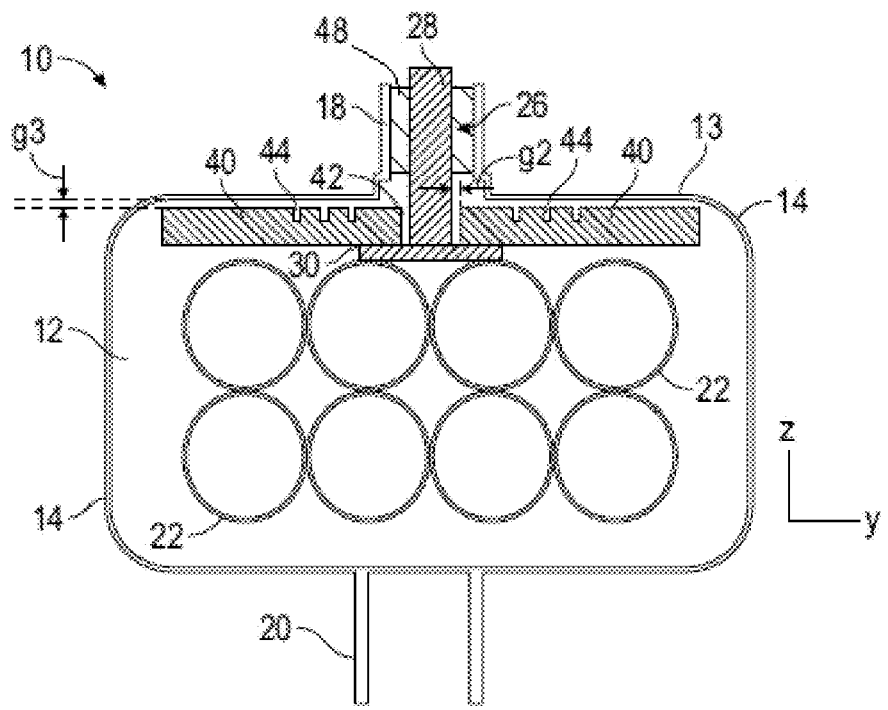
FIG. 3 is a side cross-sectional view of an embodiment of an ion pump including a baffle having a plurality of passages in the form of slots.
Figure 4:
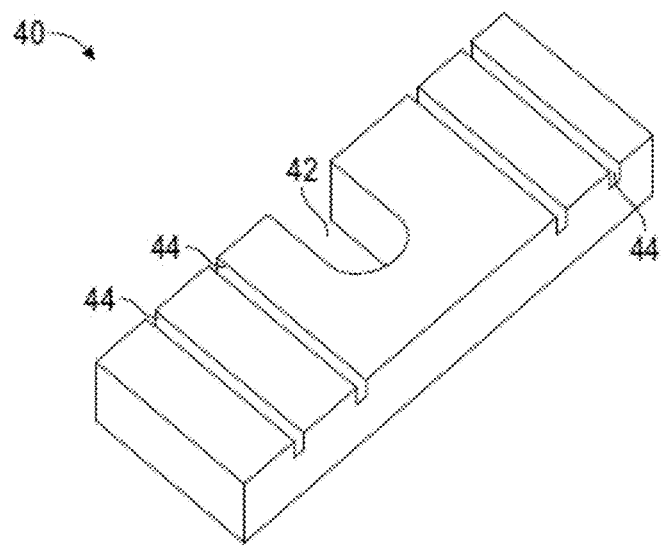
FIG. 4 is a perspective view of an embodiment of a baffle configured to be inserted into a pumping chamber of an ion pump for controlling migration of particles.

Referring to FIG. 3, in an embodiment, the baffle 40 includes one or more passageways in the form of slots 44 at the surface of the baffle 40 that faces the feedthrough 18. The slots 44 provide paths for escape of gas molecules and smaller particles. The size of the slots 44 may have a size (e.g., depth in the z-axis direction, and/or width orthogonal to the depth) that is less than or equal to the selected particle size. For example, the size of the slots 44 is at least substantially the same as that of the gap g1. A gap g3 in this embodiment may also be configured to provide the path (e.g., is at least substantially the same as the gap g1) or may be smaller. For example, the gap g3 may be a slip-fit tolerance. FIG. 4 is a perspective view of the baffle 40 including the slots 44 and the opening 42.

Figure 5:
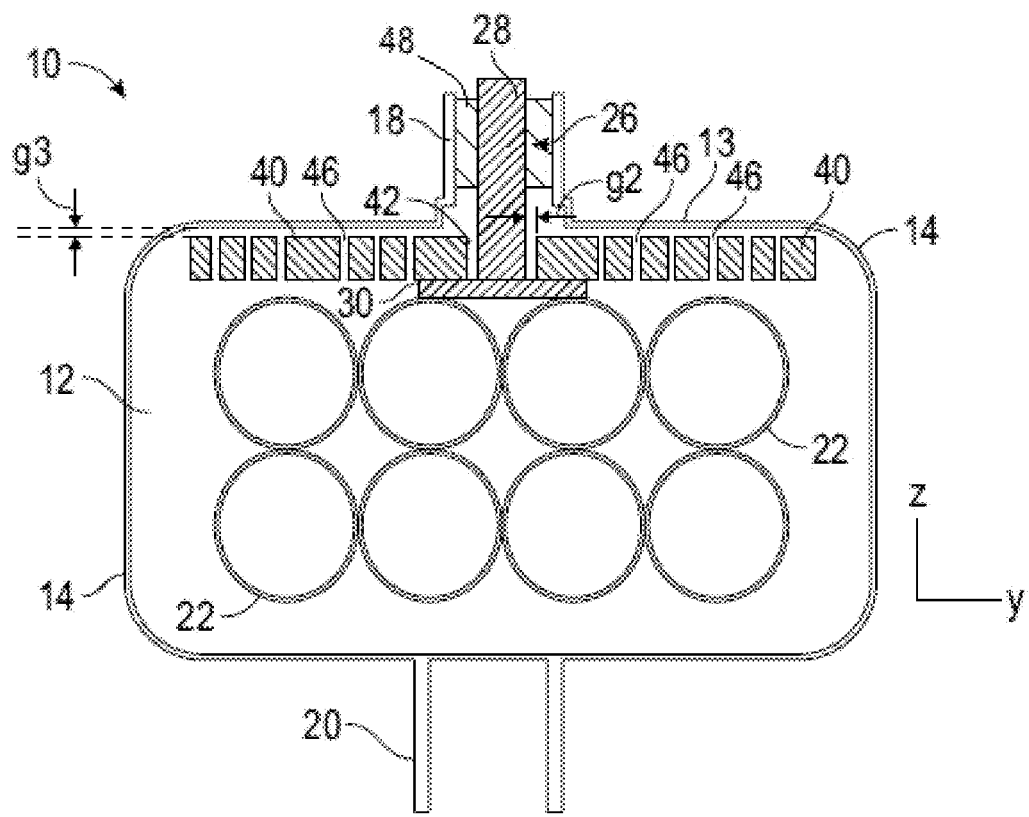
FIG. 5 is a side cross-sectional view of an embodiment of an ion pump including a baffle having a plurality of passages in the form of through-holes.

FIG. 5 depicts an embodiment of the ion pump 10 and the baffle 40, which includes passageways 46 that extend through the body of the baffle 40. The passageways 46 may be formed in any suitable manner. For example, the passageways 46 may be through-holes drilled through the baffle 40 body. In other examples, the passageways 46 are formed by a porous structure or a honeycomb structure of the baffle 40. It is noted that the size, shape and dimensions of the baffle 40, slots 44, passageways 46, gaps g1, g2 and g3 and other components are not limited to the specific embodiments described herein.

Although the baffle 40 is described as being made from a single integral body, the baffle 40 is not so limited. For example, the baffle 40 can be made by attaching multiple pieces together (e.g., via welding or adhesive). In another example, the baffle 40 can be provided as multiple pieces that can be separately inserted to form the baffle.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An ion pump for use in a low gravity environment, comprising:
   a housing at least partially defining a pumping chamber, the pumping chamber enclosing a first cathode plate and a second cathode plate, and a plurality of cylindrical anodes disposed between the first cathode plate and the second cathode plate;
   a feedthrough extending external to the pumping chamber from a wall of the housing; and
   a baffle including a body disposed in a space between the plurality of anodes and an inner surface of the wall, the body having dimensions selected to prevent particles having a size greater than a selected particle size from migrating from the pumping chamber to the feedthrough when in the low gravity environment.

2. The ion pump of claim 1, wherein the selected particle size is in a range of about 0.01 inches to about 0.02 inches.

3. The ion pump of claim 1, wherein the selected particle size is less than or equal to a size of particles of material that have separated from surfaces of the pumping chamber.

4. The ion pump of claim 1, wherein the dimensions include a thickness of the body, the thickness selected so that the body and the inner surface define a gap between the baffle and the inner surface, the gap having a width that is less than or equal to the selected particle size.

5. The ion pump of claim 1, wherein the body includes one or more passageways configured to permit passage of gas molecules and other particles that are smaller than the selected particle size into the feedthrough.

6. The ion pump of claim 5, wherein the one or more passageways includes one or more slots.

7. The ion pump of claim 5, wherein the one or more passageways extend through the body of the baffle.

8. The ion pump of claim 1, further comprising a terminal having a base portion and a post, the base portion in electrical contact with the anodes, the body disposed between the base portion and the inner surface of the wall.

9. The ion pump of claim 8, wherein the body includes an opening configured to permit the body to be inserted in the space and at least partially surround the post.

10. The ion pump of claim 1, wherein the low gravity environment is a zero gravity environment.

11. A method of assembling an ion pump for use in a low gravity environment, comprising:
    inserting a baffle including a body into a housing that at least partially defines a pumping chamber, the housing supporting a first cathode plate and a second cathode plate, and a plurality of cylindrical anodes disposed between the first cathode plate and the second cathode plate, the housing connected to a feedthrough extending externally from a wall of the housing, wherein inserting the baffle includes disposing the body into a space between the plurality of anodes and an inner surface of the wall, the body having dimensions selected to prevent particles having a size greater than a selected particle size from migrating from the pumping chamber to the feedthrough when in the low gravity environment; and
    forming the pumping chamber by enclosing the first cathode plate, the second cathode plate, the plurality of anodes and the baffle.

12. The method of claim 11, wherein the selected particle size is in a range of about 0.01 inches to about 0.02 inches.

13. The method of claim 11, wherein the selected particle size is less than or equal to a size of particles of cathode material that have been separated from surfaces of the pumping chamber.

14. The method of claim 11, wherein the dimensions include a thickness of the body, the thickness selected so that the body and the inner surface define a gap between the baffle and the inner surface, the gap having a width that is less than or equal to the selected particle size.

15. The method of claim 11, wherein the body includes one or more passageways configured to permit passage of gas molecules and other particles that are smaller than the selected particle size into the feedthrough.

16. The method of claim 15, wherein the one or more passageways includes one or more slots.

17. The method of claim 15, wherein the one or more passageways extend through the body of the baffle.

18. The method of claim 11, wherein a terminal having a base portion and a post is in electrical contact with the anodes, and inserting the baffle includes disposing the baffle between the base portion and the inner surface of the wall.

19. The method of claim 18, wherein the body includes an opening configured to permit the body to be inserted in the space and at least partially surround the post.

20. The method of claim 11, wherein the low gravity environment is a zero gravity environment.

* * * * *